United States Patent Office 2,701,812
Patented Feb. 8, 1955

2,701,812

DIARYLARSENIOUS ACID DERIVATIVES AND THE PREPARATION THEREOF

Kiyoshi Takahashi and Takeo Ueda, Musashino-Shi, Tokyo, Japan, assignors to Dainippon Pharmaceutical Co., Ltd., Osaka, Japan No Drawing. Application June 17, 1952,
Serial No. 294,076

Claims priority, application Japan June 26, 1951

19 Claims. (Cl. 260—440)

This invention relates to diarylarsenious acid derivatives which are anti-bacterial substances having the following general formula and to a process of preparing the same:

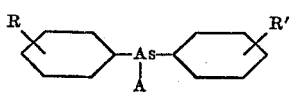

(I)

wherein R and R' are at least one nuclear substituent radical selected from the group consisting of hydrogen, halogen, hydroxy, amino, carboxy and nitro radicals, A is a radical selected from the group consisting of halogen, hydroxy, and —SR" (R" being an organic radical) radicals which can be combined with the trivalent arsenic atom.

The inventors have discovered how to obtain anti-bacterial substances from organic arsenical compounds, have investigated arylarsonic acid, arylarsonous acid, diarylarsinic acid, diarylarsenious acid and their derivatives and, as a result, have found that diarylarsenious acid and its derivatives, especially, diarylthioarsenites, have the most satisfactory anti-bacterial properties. While, among them, diarylarsenious acid, especially diphenylarsenious acid (II) is generally known in the form of anhydride (III), its nuclear substitution product is an entirely novel compound:

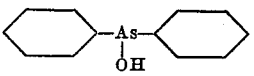

(II)

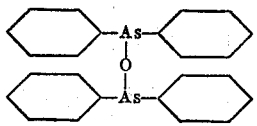

(III)

It has been found that, for example, diphenylarsenious acid, 4-hydroxy-diphenylarsenious acid and 3-amino-4-hydroxy-diphenylarsenious acid among the above mentioned compounds, have strong anti-bacterial properties and can be cultured in bouillon medium without any loss of activity. They are especially active against gram-negative bacteria, protozoa, viruses and other micro-organisms and are active against resistant bacteria as their characteristics but have a disadvantage of being very toxic. However, applicants found that diarylthioarsenites, obtained by heating a diarylarsenious acid with a thiol compound, have not at all such a disadvantage and are satisfactory.

Diphenylarsenious acid which is one of the above-mentioned generally known compounds could be produced heretofore by a process different from that claimed in this specification by the inventors. But the method is not industrially advantageous and can hardly be utilized for preparing a nuclear substitution product in accordance with this invention.

One of the objects of this invention is to provide diarylarsenious acid derivatives which are strong in anti-bacterial properties.

Another object of this invention is to provide diarylthioarsenites which are strong in anti-bacterial properties and little toxic.

A further object of this invention is to provide a commercial process of preparing these novel substances.

According to this invention, a diarylarsenious acid or its nuclear substitution product is obtained by dissolving or suspending a corresponding diarylarsinic acid or its nuclear substitution product in acid or dilute acid and by making sulfurous acid react thereon in the presence of hydroiodic acid as a reduction-accelerator. In order to make said sulfurous acid react, sulfurous acid gas ($SO_2$ gas) may be introduced. Sulfite or bisulfite may be added as said sulfurous acid:

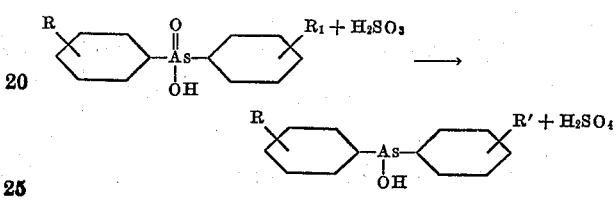

Diarylthioarsenites are produced in high yield by reacting thiol compounds with corresponding diarylarsenious acids, diarylarsine halides or the like derivatives. This reaction may be carried out in an aqueous medium or an organic solvent medium. The medium may be acidic to weakly alkaline. The reaction temperature may be room temperature, but is preferably at about the boiling point of the solvent, whereby the reaction can be immediately completed. Diarylthioarsenite may also be produced by reacting a thiol compound with corresponding arsinic acid:

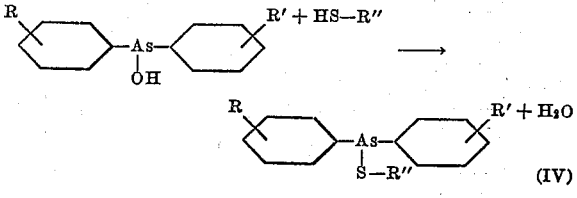

(IV)

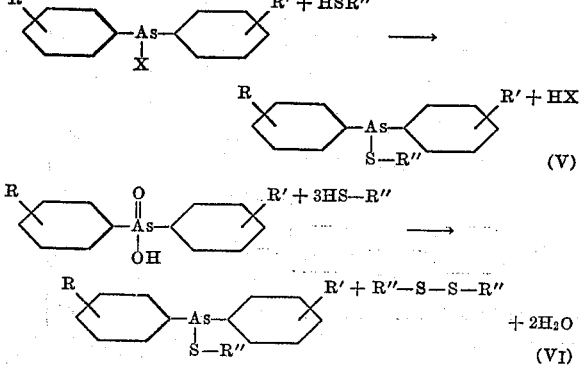

(V)

(VI)

wherein R" is such radical as is mentioned above and X is an univalent acid radical such as halogen, ½ sulfuric acid, sulfonic acid or imino radical.

Series of compounds thus obtained are mostly crystalline substances each having a definite melting point or decomposition point and showing strong anti-bacterial properties. Examples thereof are listed in the following table where, by using a medium containing complete bouillon, the maximum dilution (in concentration of mol) necessary for bacteriostatics after 48 hours was measured by the serial dilution method:

TABLE I

| Compounds | Bacillus coli communis | Staphylococcus aureus (Terashima) | Typhus abdominalis | Shigella dysenteriae (Komagome IIIB) |
|---|---|---|---|---|
| HO-C₆H₄-As(-C₆H₄-)-S-C₆H₄-COOH | $10^{-5}$ | $10^{-6}$ | $10^{-7}$ | $10^{-7}$ |
| HO-C₆H₄-As(-C₆H₄-)-S-CH₂-COOH | $10^{-6}$ | $10^{-10}$ | $10^{-10}$ | $10^{-9}$ |
| HO-C₆H₄-As-S-C₆H₄-COOH | $10^{-7}$ | $10^{-7}$ | $10^{-8}$ | $10^{-8}$ |
| -As-S-CH₂-COOH | $10^{-8}$ | $10^{-8}$ | $10^{-8}$ | $10^{-8}$ |
| H₂N-,HO-C₆H₃-As(-C₆H₄-)-S-C₆H₄-COOH | $10^{-6}$ | $10^{-9}$ | $10^{-7}$ | $10^{-6}$ |
| H₂N-,HO-C₆H₃-As-S-CH₂-CH(NH₂)-COOH | $10^{-6}$ | $10^{-8}$ | $10^{-8}$ | $10^{-6}$ |
| H₂N-,HO-C₆H₃-As-S-CH(COOH)-CH₂-COOH | $10^{-6}$ | $10^{-6}$ | $10^{-8}$ | $10^{-8}$ |
| (C₆H₅)As-O-As(C₆H₅) | $10^{-6}$ | $10^{-5}$ | $10^{-6}$ | $10^{-7}$ |
| C₆H₅-As(OH)-C₆H₄-OH | $10^{-6}$ | $10^{-7}$ | $10^{-6}$ | $10^{-8}$ |
| C₆H₅-As(OH)-C₆H₃(NH₂·HCl)-OH | $10^{-5}$ | $10^{-8}$ | $10^{-6}$ | $10^{-8}$ |
| Chloramphenicol | $10^{-5}$ | $10^{-5}$ | $10^{-4}$ | $10^{-5}$ |

The above table wherein the last four items are for the sake of comparison shows that the new compounds are remarkably superior to existing ones.

The following examples illustrate the invention but are not to be construed as limiting the same.

Examples illustrating Equation IV are as follows:

Example 1

10 grams of 4-hydroxy-diphenylarsinic acid are suspended in 20 cc. of 10% sulfuric acid and saturated with sulfur dioxide at about 60° C. in the presence of a small amount of potassium iodide. A thin yellow oily substance is formed and is gradually solidified, and then filtered off and recrystallized from ethyl acetate. There are obtained 6 grams of 4-hydroxy-diphenylarsenious acid, which is composed of colorless fine needles and melts at 160 to 170° C.

*Analysis:*—Calculated for $C_{12}H_{11}O_2As$: As, 28.59%.
Found: As, 28.49%.

Example 2

10 grams of 4-amino-diphenylarsinic acid are dissolved in 15 cc. of concentrated hydrochloric acid and saturated with sulfur dioxide in the presence of a small amount of potassium iodide. A dark red oily substance is formed and gradually solidified and then filtered off. There are obtained 4 grams of 4-amino-diphenylarsenious acid, which is composed of brownish powder of decomposition point of 113° C.

*Analysis.*—Calculated for $C_{12}H_{12}ONAs$: As, 30.58%. Found: As, 31.02%.

Example 3

10 grams of 3-amino-4-hydroxy-diphenylarsinic acid are suspended in 200 cc. of water, and 10% sulfuric acid is added thereto until it is completely dissolved. The solution is treated with active carbon and filtered to obtain a slight yellow filtrate. The filtered solution is saturated with sulfur dioxide in the presence of a small amount of potassium iodide. The solution is allowed to stand overnight and then neutralized with aqueous ammonia solution to deposit a white precipitate, which is filtered off to obtain about 7 grams of 3-amino-4-hydroxy-diphenylarsenious acid. Thereafter, an equi-mole of hydrochloric acid is mixed with the product, and the mixture treated with active carbon. The solution thus obtained is subjected to freezing and drying until the salt of 3-amino-4-hydroxy-diphenylarsenious acid is formed.

*Analysis.*—Calculated for $C_{12}H_{12}O_2NAsHCl$: As, 23.89%. Found: As, 23.51%.

Example 4

10 grams of 2,2'-dicarboxydiphenylarsinic acid anhydride are dissolved in 1 liter of water and 50 cc. of concentrated hydrochloric acid, then a small amount of potassium iodide and 15 grams of sodium bisulphite are added. The solution thus obtained is allowed to stand overnight to deposit 2,2'-dicarboxydiphenylarsenious acid anhydride, which is filtered. There are obtained 7 grams of said anhydride, which is composed of yellow fine needles and melts at 180 to 182° C.

*Analysis.*—Calculated for $C_{14}H_9O_4As$: As, 36.26%. Found: As, 36.47%.

Example 5

0.54 gram of diphenylarsinic acid is dissolved in 50 cc. of hot water and 5 cc. of 10% sulfuric acid is added thereto. The solution is saturated with sulfur dioxide in the presence of a small amount of potassium iodide, then allowed to stand in an ice chest for a short time to precipitate diphenylarsenious oxide, which is filtered and recrystallized from dilute alcohol. There is obtained 0.26 gram of pure diphenylarsenious oxide, which is composed of white powder and melts at 91 to 92° C. The substance is soluble in alcohol, glacial acetic acid, ethyl acetate and chloroform, but hardly soluble in water, ether and benzene.

*Analysis.*—Calculated for $C_{24}H_{20}OAs_2$: As, 31.67%. Found: As, 31.60%.

Example 6

1 gram of 4-carboxydiphenylarsinic acid is completely dissolved in 150 cc. of water while slightly heated. A small amount of hydrochloric acid is added to the solution, which is then saturated with sulfur dioxide in the presence of a small amount of potassium iodide. When sulfur dioxide gas is introduced therein, the reduction product floats on the surface of the solution and soon precipitates. The solution is allowed to stand in an ice chest for a short time to throw down a precipitate, which is filtered off and washed with water. There is obtained white powder of 4-carboxydiphenylarsenious acid in almost quantitative yield, which is hardly soluble in water and almost all organic solvents. Over about 120° C., it colors and softens but has no definite melting point.

*Analysis.*—Calculated for $C_{13}H_{11}O_3As$: As, 25.80%. Found: As, 25.53%.

Example 7

1 gram of 2-aminodiphenylarsinic acid is dissolved in 5 cc. of concentrated hydrochloric acid and a small amount of potassium iodide solution is added, then saturated with sulfur dioxide to deposit a dark red oily product. After the upper clear solution is decanted, the residual oily product is boiled together with an alcoholic potassium hydroxide solution for a short time and is hydrolyzed. The alcohol is distilled off, water is added to the residue until potassium chloride is dissolved, and then acetic acid is added to form 2-aminodiphenylarsenious acid, which is an orange yellow powder. The product gradually becomes black with decomposition at over 140° C. or so, and the solubility for various solvents of which is that it is easily soluble in glacial acetic acid and ethyl acetate and is soluble in alcohol and acetone but insoluble in water, ether and benzene.

*Analysis.*—Calculated for $C_{12}H_{12}ONAs$: N, 5.71%; As, 30.58%. Found: N, 5.85%; As, 30.03%.

Example 8

0.5 gram of 4,4'-dihydroxydiphenylarsinic acid is dissolved in 50 cc. of 10% sulfuric acid, and a small amount of potassium iodide is added thereto. The solution is saturated with sulfur dioxide at 50 to 60° C. After the reaction is completed, the solution is allowed to stand in an ice chest for 1 to 2 hours to form a precipitate which is filtered off, and recrystallized from water. There is obtained about 0.2 gram of 4,4'-dihydroxydiphenylarsenious acid as yellow square column-shaped crystals, which decompose over about 85° C. with bubbling and are easily soluble in hot water, glacial acetic acid, acetone, ethyl acetate and alcohol, but hardly soluble in benzene and ether.

*Analysis.*—Calculated for $C_{12}H_{11}O_3As$: As, 26.95%. Found: As, 26.84%.

Example 9

1 gram of 4-nitro-4'-carboxydiphenylarsinic acid is almost completely dissolved in 100 cc. of water and 10 cc. of 10% sulfuric acid, and then a small amount of potassium iodide solution is added thereto. The solution is saturated with sulfur dioxide at 50 to 70° C. There is formed about 0.6 gram of crude 4-nitro-4'-carboxydiphenylarsenious acid, which is recrystallized from ethyl acetate to obtain a refined product having a melting point of 217 to 220° C. and being easily soluble in glacial acetic acid and ethyl acetate, soluble in water and alcohol but hardly soluble in ether and benzene.

*Analysis.*—Calculated for $C_{13}H_{10}O_5NAs$: As, 22.36%. Found: As, 22.40%.

Example 10

2 grams of 3-nitro-4-hydroxydiphenylarsinic acid are dissolved in 150 cc. of water and 10 cc. of 10% sulfuric acid, and then a small amount of potassium iodide solution is added thereto. The solution is then saturated with sulfur dioxide at 50 to 70° C. There is obtained about 1.3 grams of crude 3-nitro-4-hydroxydiphenylarsenious acid, which is recrystallized from alcohol to form yellow short column crystals. This product melts at 142 to 144° C. and is insoluble in water, ether, benzene, kerosene and ether, soluble in alcohol and acetone and easily soluble in hot alcohol, hydrochloric acid and glacial acetic acid.

*Analysis.*—Calculated for $C_{12}H_{10}O_4NAs$: As, 24.40%. Found: As, 24.25%.

Example 11

1 gram of 3-nitro-4-hydroxy-4'-chlorodiphenylarsinic acid is dissolved in 400 cc. of water and 20 cc. of 10% sulfuric acid, and then a small amount of potassium iodide solution is added thereto. The solution is saturated with sulfur dioxide at 60 to 80° C. There is obtained about 0.5 gram of crude 3-nitro-4-hydroxy-4'-chlorodiphenylarsenious acid, which is recrystallized from ethyl acetate. The refined product is a light yellow powder melting at 198 to 202° C., and is easily soluble in glacial acetic acid, alcohol and acetone and hardly soluble in water, benzene and ether.

*Analysis.*—Calculated for $C_{12}H_9O_4NClAs$: As, 21.94%. Found: As, 21.78%.

Examples illustrating Equation V are as follows:

Example 12

2.8 grams of 3-amino-4-hydroxydiphenylarsenious acid and 1.5 grams of thiosalicyclic acid are dissolved in 50 cc. of alcohol. The solution is heated at about 60° C. for half an hour and then the alcohol is evaporated off until 3-amino-4-hydroxydiphenyl-o-carboxyphenylthioarsenite is formed. The solution is allowed to stand in an ice chest overnight to form a precipitate. The solution is filtered to separate the said precipitate and the residue thus obtained is dried. There are obtained 3.5 grams of yellowish brown needles of said compound, which is hardly soluble in water but soluble in alcohol.

*Analysis.*—Calculated for $C_{19}H_{16}O_3NSAs$: As, 18.16%. Found: As, 18.01%.

Example 13

3.8 grams of disodium 4,4'-dicarboxydiphenylarsinate are dissolved in 40 cc. of water. 1 gram of thioglycollic acid is added thereto, and neutralized by adding aqueous caustic soda solution. The solution is evaporated under reduced pressure until the sodium salt of 4,4'-dicarboxydiphenylcarboxymethylthioarsenite is deposited. There are obtained about 5 grams of colorless needles of said compound, which is soluble in water but hardly soluble in organic solvents.

*Analysis.*—Calculated for $C_{14}H_{10}O_6AsNa$: As, 17.94%. Found: As, 17.69%.

Example 14

0.95 gram of diphenylarsenious oxide is reacted with 0.37 gram of thioglycollic acid in 50 cc. of hot water to obtain a light yellow precipitate, which is recrystallized from dilute alcohol. There is obtained about 0.8 gram of diphenyl-carboxymethyl-thioarsenite.

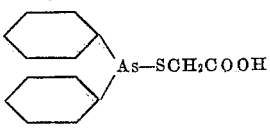

as colorless fine crystals, which melt at 94° C., and are easily soluble in alcohol, glacial acetic acid and ethyl acetate, soluble in acetone but hardly soluble in benzene.

*Analysis.*—Calculated for $C_{14}H_{13}O_2SAs$: As, 23.41%. Found: As, 23.25%.

Example 15

When 0.95 gram of diphenylarsenious oxide, 0.63 gram of cystine hydrochloride and 0.7 gram of crystalline sodium acetate are mixed into 50 cc. of hot water, they immediately react on one another and precipitate a white powder of diphenyl-β-carboxyethylthioarsenite

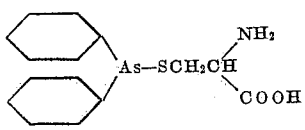

which is filtered and thoroughly washed with water. There are obtained 1.1 grams of said compound which decomposes at 143 to 144° C. with bubbling, and is hardly soluble in almost all organic solvents and slightly soluble in hot water.

*Analysis.*—Calculated for $C_{15}H_{16}O_2NSAs$: N, 4.01%; As, 21.46%. Found: N, 3.95%; As, 21.35%.

Example 16

0.95 gram of diphenylarsenious oxide is suspended in 50 cc. of water with 0.60 gram of thiomalic acid and is heated on a water bath for a short time. Thereupon a light yellow oily substance separates, which is cooled until it solidifies. After cooling, the upper clear liquid is discarded. The residue thus obtained is redissolved in the smallest possible amount of hot alcohol, into which hot water is added to slight turbidness. It is decolorized with active carbon, and filtered. The filtrate thus obtained is cooled, and rubbing the wall of vessel, there is obtained about 8 grams of diphenyl-α-carboxy-β-carboxyethylthioarsenite

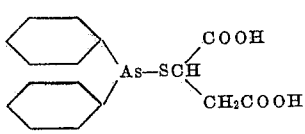

as a white crystalline powder, which melts at 135 to 136° C., and is easily soluble in alcohol, acetone, glacial acetic acid, ethyl acetate and ether, soluble in water but insoluble in benzene. Aqueous solution thereof is not colored with ferric chloride.

*Analysis.*—Calculated for $C_{16}H_{15}O_4SAs$: As, 19.80%. Found: As, 19.87%.

Example 17

0.95 gram of diphenylarsenious oxide and 0.62 gram of thiosalicylic acid are mixed in 100 cc. of hot water, and a yellow precipitate and white suspended matter are deposited. Both deposits are filtered off and are recrystallized from dilute alcohol. There is obtained about 0.6 gram of diphenyl-o-carboxyphenylthioarsenite

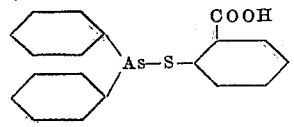

as colorless small plates of fine needles, which melt at 121 to 122° C., and are easily soluble in alcohol, glacial acetic acid, ethyl acetate and acetone, soluble in ether but hardly soluble in water and benzene. The alcohol solution thereof shows no color upon adding ferric chloride.

*Analysis.*—Calculated for $C_{19}H_{15}O_2SAs$: As, 19.16%. Found: As, 20.20%.

Example 18

1 gram of 4-hydroxydiphenylarsenious acid is dissolved in 5 cc. of alcohol and 0.38 gram of thioglycollic acid is added thereto. The solution is then heated on a water bath for a short time. Being decolorized with active carbon, and distilled under reduced pressure to remove the alcohol, there is obtained 4-hydroxydiphenyl-carboxymethylthioarsenite,

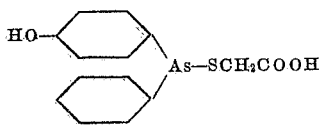

as a light yellow powder, which melts at 83 to 85° C., and is easily soluble in alcohol, glacial acetic acid, acetone and ethyl acetate but insoluble in benzene, ether and water. The yield is almost quantitative.

*Analysis.*—Calculated for $C_{14}H_3O_3SAs$: As, 22.29%. Found: As, 22.09%.

Example 19

0.5 gram of 4-hydroxydiphenylarsenious acid and 0.3 gram of thiosalicylic acid are completely dissolved in 5 cc. of alcohol heated in a water bath. Water is added dropwise into the solution while hot to slight turbidness. When decolorized with active carbon, filtered, and the filtrate thus obtained cooled, there is obtained 4-hydroxydiphenyl-o-carboxyphenyl-thioarsenite

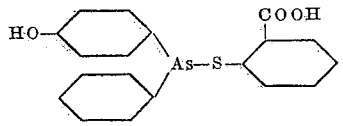

as yellow crystalline powder, which melts with decomposition at around 120° C., and is easily soluble in alcohol, glacial acetic acid and acetone but hardly soluble in water, ether and benzene.

*Analysis.*—Calculated for $C_{19}H_{15}O_3SAs$: As, 18.82%. Found: As, 19.03%.

Example 20

0.96 gram of 3-amino-4-hydroxydiphenylarsinic acid is suspended in 30 cc. of hot water and is almost completely dissolved with the addition of 10% sulfuric acid. On decolorizing with addition of active carbon, a slightly yellow solution is obtained. A small amount of potassium iodide is added thereto, and the solution is saturated with sulfur dioxide. After the solution is allowed to stand in an ice chest for a short time, excess of sulfur dioxide gas is replaced by carbon dioxide gas. The solution is neutralized with dilute aqueous ammonia solution, cooling, and then white arsenious acid separates. 0.39 gram of thioglycollic acid is added to the above mixture, they immediately react on each other to deposit 3-amino-4-hydroxydiphenyl-carboxymethyl-thioarsenite

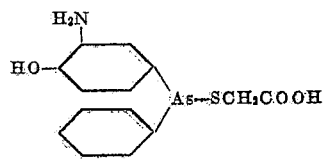

in the form of a yellow mass. When the deposit is dissolved in a small amount of alcohol, decolorized with active carbon and evaporated to dryness under reduced pressure in freezing, there is obtained 0.8 gram of said compound as light yellow fine needles, which melt at 53 to 55° C., and are easily soluble in alcohol, glacial acetic acid and acetone, and insoluble in water, benzene, ether and chloroform.

Analysis.—Calculated for C₁₄H₁₄O₃NSAs: N, 3.99%; As, 21.34%. Found: N, 4.15%; As, 21.71%.

Example 21

The arsenious acid is prepared, as in Example 20. A solution consisting of 0.55 gram of cystine hydrochloride, 1 gram of crystalline sodium acetate and 5 cc. of water are added to the above mixture. The mixture is immediately assimilated to a gel form, which is filtered, thoroughly washed with water and then dried in vacuo on phosphorus pentoxide. There are obtained 1.1 grams of 3 - amino-4-hydroxydiphenyl-β-amino-β-carboxyethylthioarsenite

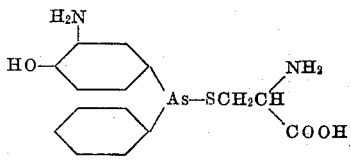

which darkens over 158° C. and completely decomposes at 162° C. and is easily soluble in hydrochloric acid, soluble in hot water but insoluble in acetone, alcohol, ether and benzene.

Analysis.—Calculated for C₁₅H₁₇O₃N₂SAs: N, 7.37%; As, 19.72%. Found: N, 7.13%; As, 19.56%.

Example 22

The arsenious acid is prepared, as in Example 20. 0.5 gram of thiomalic acid is added to the above mixture, they immediately react on each other and are completely redissolved. The solution being made slightly acidic to litmus, 3-amino-4-hydroxydiphenyl-α-carboxy-β-carboxyethylthioarsenite

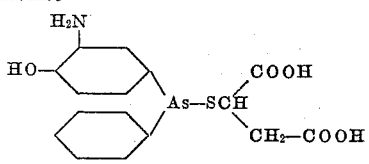

is separated. The deposit is filtered off and is recrystallized from dilute alcohol, then there is obtained about 0.6 gram of said compound as light yellow powder, which melts at 89 to 91° C. and is easily soluble in alcohol, acetone and glacial acetic acid, but hardly soluble in water, ether, benzene and chloroform. Its aqueous solution is not colorized with ferric chloride.

Analysis.—Calculated for C₁₆H₁₆O₅NSAs: As, 18.32%. Found: As, 18.57%.

Examples illustrating Equation VI are as follows:

Example 23

A mixture of 0.26 gram of diphenylarsinic acid, 0.5 gram of cystine hydrochloride, 0.48 gram of crystalline sodium acetate and 10 cc. of alcohol is heated in a water bath for about one hour, and the mixture is then filtered while it is hot. The residue thus obtained is boiled for several minutes in 60 cc. of water, thereby to dissolve cystine coexisting in the solution, and then filtered while it is hot, and washed with water. There is obtained 0.4 gram of diphenyl-β-amino - β - carboxyethylthioarsenite, which is a white powder melting with decomposition at 143 to 144° C.

Example 24

A mixture of 0.23 gram of 4-hydroxydiphenylarsinic acid, 0.54 gram of thiosalicylic acid and 10 cc. of alcohol, is heated under reflux on a water bath for two hours and filtered while it is hot. By adding the same volume of water to the filtrate, 4-hydroxydiphenyl-o-carboxyphenylthioarsenite separates, and it is filtered and dried. There are obtained 3.5 grams of said product as yellow powder, which melts with decomposition at 120° C.

Example 25

A mixture of 0.29 gram of 3-amino-4-hydroxydiphenylarsinic acid, 0.32 gram of thioglycollic acid and 12.5 cc. of absolute alcohol is heated under reflux on a water bath for two hours. The alcohol is removed by distillation under reduced pressure. The residue is boiled with addition of 25 cc. of water and filtered. There are obtained 3.5 grams of 3-amino-4-hydroxydiphenylcarboxymethylthioarsenite, as colorless needles which melt at 94° C.

Example 26

A mixture of 0.29 gram of 3-amino-4-hydroxydiphenylarsinic acid, 0.6 gram of thiomalic acid and alcohol (60%) is heated under reflux on a water bath for a short time and evaporated. The alcohol being removed under reduced pressure, there is obtained 0.4 gram of 3-amino-4 - hydroxydiphenyl - α - carboxy - β - carboxyethylthioarsenite, which is a white powder and melts at 135 to 136° C.

What we claim is:

1. A diarylthioarsenite corresponding to the general formula:

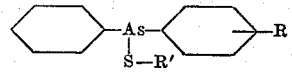

wherein R is at least one nuclear substituent radical selected from the group consisting of hydrogen, halogen, hydroxy, amino, carboxy and nitro radicals; R' is a radical selected from the group consisting of carboxymethyl, β-amino-β-carboxyethyl, α-carboxy-β-carboxyethyl and o-carboxyphenyl radicals.

2. A compound corresponding to the general formula:

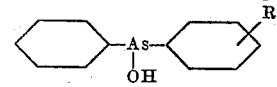

wherein R is at least one nuclear substituent radical selected from the group consisting of hydroxy, amino, halogen, nitro and carboxy radicals and n is an integer from 1 to 2.

3. A compound represented by the following formula:

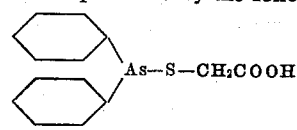

4. A compound represented by the following formula:

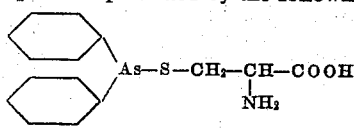

5. A compound represented by the following formula:

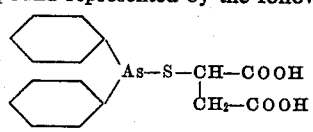

6. A compound represented by the following formula:

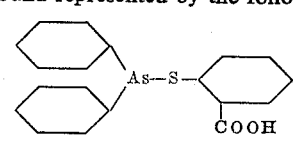

7. A compound represented by the following formula:

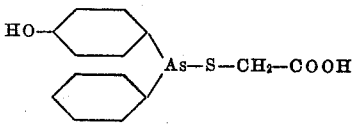

8. A compound represented by the following formula:

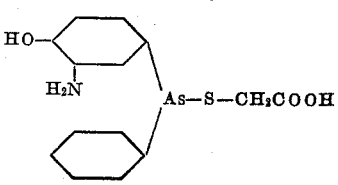

9. A compound represented by the following formula:

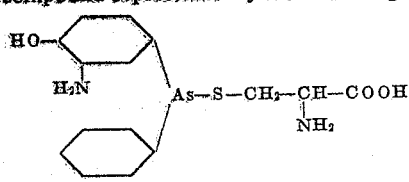

10. A compound represented by the following formula:

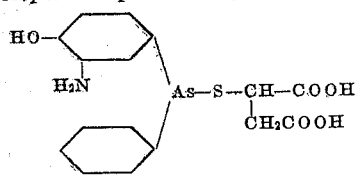

11. A compound represented by the following formula:

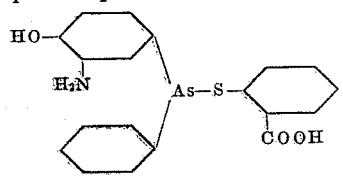

12. A compound represented by the following formula:

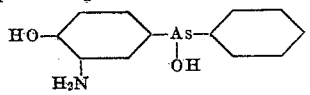

13. A compound represented by the following formula:

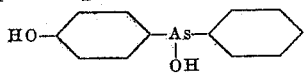

14. A process of preparing a diarylthioarsenite and its derivative corresponding to the general formula:

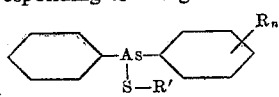

wherein $R_n$ is a radical selected from the group consisting of hydroxy, amino, halogen, nitro and carboxy radicals; R' is a radical derived from an original thiol R'SH characterized by reacting a thiol having the general formula HS–R', wherein R' is the same as heretofore, with a corresponding diarylarsenious acid compound having the general formula:

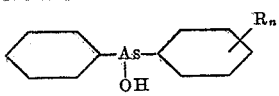

15. A process of preparing a diarylthioarsenite corresponding to the general formula:

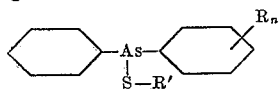

characterized by reacting a thiol having the general formula HS—R' with a corresponding diarylarsinic acid compound having the general formula:

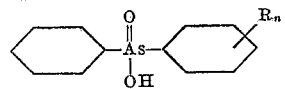

wherein $R_n$ is at least one radical selected from the group consisting of hydroxy, amino, halogen, nitro and carboxy radicals, n is an integer from 1 to 2, and R' is a radical derived from the original thiol R'SH.

16. A process of preparing a diarylarsenious acid compound comprising reacting sulfurous acid with a corresponding diarylarsinic acid in the presence of an acid and hydrogen iodide as a reduction accelerator.

17. A process in accordance with claim 16 wherein the reaction is carried out in an acidic to weak alkaline aqueous medium.

18. A process in accordance with claim 16 wherein the reaction is carried out at from room temperature to the boiling point of the medium.

19. A process as in claim 16 wherein the reaction is carried out in an organic solvent medium.

References Cited in the file of this patent

UNITED STATES PATENTS

| | | |
|---|---|---|
| Re. 16,921 | Kharasch | Apr. 3, 1928 |
| 1,677,392 | Kharasch | June 17, 1928 |

OTHER REFERENCES

Raiziss et al.: Organic Arsenical Compounds, page 215. The Chemical Catalog Co., New York city, 1923.

Goddard: A Text-Book of Inorganic Chemistry, vol. XI, page 181, 1930, London.

Beilstein, vol. XVI, page 438 (1934).